(12) United States Patent
Ferguson (10) Patent No.: US 7,232,143 B1
(45) Date of Patent: Jun. 19, 2007

(54) FOLDING BICYCLE ASSEMBLY

(76) Inventor: Oscar Ferguson, 170 - 20 130th Ave., Bldg. 12C, Apt. 11A, Queens Jamaica, NY (US) 11434

( * ) Notice: Subject to any disclaimer, the term of this patent is extended or adjusted under 35 U.S.C. 154(b) by 41 days.

(21) Appl. No.: 11/448,431

(22) Filed: Jun. 7, 2006

Related U.S. Application Data (63) Continuation-in-part of application No. 10/888,134, filed on Jul. 9, 2004, now abandoned.

(60) Provisional application No. 60/485,946, filed on Jul. 9, 2003.

(51) Int. Cl.
*B62K 1/00* (2006.01)

(52) U.S. Cl. ...................... 280/278; 280/293

(58) Field of Classification Search ............... 280/293, 280/278, 287, 301, 288.4, 272
See application file for complete search history.

(56) References Cited

U.S. PATENT DOCUMENTS

| | | | | |
|---|---|---|---|---|
| 4,417,745 A * | 11/1983 | Shomo | ...................... | 280/287 |
| 4,457,529 A * | 7/1984 | Shamie et al. | ............... | 280/278 |
| 4,834,403 A * | 5/1989 | Yanus et al. | .................. | 280/30 |
| 5,224,726 A * | 7/1993 | Gill | ............................ | 280/287 |
| 5,269,550 A | 12/1993 | Hon et al. | | |
| 5,975,561 A * | 11/1999 | Harvey et al. | ........... | 280/728.2 |
| 6,116,629 A * | 9/2000 | Koppensteiner | ............ | 280/287 |
| 6,135,668 A * | 10/2000 | Lin | ......................... | 403/322.4 |
| 6,206,395 B1 * | 3/2001 | Young | ........................ | 280/278 |
| 6,293,575 B1 * | 9/2001 | Burrows et al. | ............ | 280/287 |
| 6,336,649 B1 | 1/2002 | Lin | | |
| 6,394,479 B1 * | 5/2002 | Liu | ............................. | 280/287 |
| 6,641,159 B1 * | 11/2003 | Fan | ............................ | 280/278 |

* cited by examiner

*Primary Examiner*—Tony Winner (57) ABSTRACT

A toolless folding bicycle for facilitating storing and transporting a bicycle when not in use is provided. The toolless folding bicycle includes a bicycle assembly being designed for being ridden by a user across a support surface. The bicycle assembly comprises a frame member, a drive assembly and a steering assembly. The drive assembly is operationally coupled to the frame member whereby the drive assembly engages the support surface. The drive assembly is designed for being actuated by the user whereby the drive assembly propels the frame member across the support surface when the drive assembly is actuated by the user. The frame member is designed for supporting the user when the user is seated on the frame member. The drive assembly is operationally coupled to the frame member for steering the frame member across the support surface when the drive assembly propels the frame member.

19 Claims, 5 Drawing Sheets

Front fork locks into bracket when folded to prevent bike from moving.

Folded position

FIG 6

FOLDING BICYCLE ASSEMBLY

This application is a continuation-in-part of U.S. patent application Ser. No. 10/888,134, filed Jul. 9, 2004 now abandoned, and U.S. Provisional Application, Ser. No. 60/485,946, filed Jul. 9, 2003.

BACKGROUND OF THE INVENTION

1. Field of the Invention

This invention relates generally to a collapsible bicycle and, more particularly, the invention relates to a tool-less folding bicycle for facilitating storing and transporting a bicycle when not in use.

2. Description of the Prior Art

The use of collapsible bicycles is known in the prior art. More specifically, collapsible bicycles heretofore devised and utilized are known to consist basically of familiar, expected and obvious structural configurations, notwithstanding the myriad of designs encompassed by the crowded prior art which have been developed for the fulfillment of countless objectives and requirements.

Illustrative examples of such devices include: U.S. Pat. No. 5,269,550; U.S. Pat. No. 4,417,745; and U.S. Pat. No. 5,975,561.

In these respects, the tool less folding bicycle according to the present invention substantially departs from the conventional concepts and designs of the prior art, and in so doing provides an apparatus primarily developed for the purpose of facilitating storing and transporting a bicycle when not in use.

SUMMARY

In view of the foregoing disadvantages inherent in the known types of collapsible bicycles now present in the prior art, the present invention provides a new tool less folding bicycle construction wherein the same can be utilized for facilitating storing and transporting a bicycle when not in use.

To attain this, the present invention generally comprises a bicycle assembly being designed for being ridden by a user across a support surface. The bicycle assembly comprises a frame member, a drive assembly and a steering assembly. The drive assembly is operationally coupled to the frame member whereby the drive assembly is designed for engaging the support surface. The drive assembly is designed for being actuated by the user whereby the drive assembly propels the frame member across the support surface when the drive assembly is actuated by the user. The frame member is designed for supporting the user when the user is seated on the frame member. The drive assembly is operationally coupled to the frame member for steering the frame member across the support surface when the drive assembly is propelling frame member.

There has thus been outlined, rather broadly, the more important features of a folding bicycle in order that the detailed description thereof that follows may be better understood, and in order that the present contribution to the art may be better appreciated. There are additional features of the folding bicycle that will be described hereinafter and which will form the subject matter of the claims appended hereto.

In this respect, before explaining at least one embodiment of the folding bicycle in detail, it is to be understood that the folding bicycle is not limited in its application to the details of construction and to the arrangements of the components set forth in the following description or illustrated in the drawings. The folding bicycle is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present folding bicycle. It is important, therefore, that the claims be regarded as including such equivalent constructions insofar as they do not depart from the spirit and scope of the present invention.

One object of the present invention is to allow a user to fold the frame to allow the bicycle to be easily stored when the bicycle is not in use.

It is another object of the present invention to provide a folding bicycle which has all of the advantages of the prior art and none of the disadvantages.

It is another object of the present invention to provide a folding bicycle which may be easily and efficiently manufactured and marketed.

It is another object of the present invention to provide a folding bicycle which is of durable and reliable construction.

It is yet another object of the present invention to folding bicycle which is economically affordable and available for relevant market segment of the purchasing public.

It is yet another object of the present invention to provide a folding bicycle which incorporates a kickstand.

Other objects, features and advantages of the present invention will become more readily apparent from the following detailed description of the preferred embodiment when considered with the attached drawings and appended claims.

DETAILED DESCRIPTION OF THE PREFERRED EMBODIMENTS

With reference now to the drawings, and in particular to FIGS. 1-5 thereof, a new tool less folding bicycle embodying the principles and concepts of the present invention and generally designated by the reference numeral 10 will be described.

As best illustrated in FIGS. 1-5, the tool less folding bicycle 10 generally comprises a bicycle assembly 12 being designed for being ridden by a user across a support surface such as the ground, for example. The bicycle assembly 12 comprises a frame member 14, a drive assembly 16 and a steering assembly 18. The drive assembly 16 is operationally coupled to the frame member 14 whereby the drive assembly 16 is designed for engaging the support surface. The drive assembly 16 is designed for being actuated by the user whereby the drive assembly 16 propels the frame member 14 across the support surface when the drive assembly 16 is actuated by the user. The frame member 14 is designed for supporting the user when the user is seated on the seat supported by the frame member 14. The steering assembly 18 is operationally coupled to the frame member 14 whereby the steering assembly 18 is for steering the bicycle assembly 12 across the support surface when propelled by the drive assembly 16.

The frame member 14 comprises a front portion 20 and rear portion 22. The front portion 20 of the frame member 14 is pivotally coupled to the rear portion 22. The pivotal coupling takes place in two places, namely at the junction of the front crossbar member 24 and the rear crossbar member 26, and at the junction of the front down tube member 25 and the rear down tube member 27. The front portion 20 of the frame member 14 can be pivoted between a deployed position and a storage position with respect to the rear portion 22 of the frame member 14. The deployed position is defined by the front portion 20 substantially aligned with the rear portion 22 of the frame member 14 thus creating an essentially rigid rod to allow the propulsion of the bicycle assembly 12 across the support surface. The storage position is defined by the front portion 20 of the frame member 14 being pivoted to a position adjacent the rear portion 22 of the frame member 14 to facilitate storage of the bicycle assembly 12. The steering assembly 18 is operationally coupled to the front portion 20 of the frame member 14. The drive assembly 16 is operationally coupled to the rear portion 22 of the frame member 14.

The front portion 20 of the frame member 14 comprises a front crossbar member 24 and a front down tube member 25. The rear portion 22 of the frame member 14 comprises a rear crossbar member 26 and a rear down tube member 27. The front crossbar member 24 is hingably coupled to the rear crossbar member 26 to permit the front portion 20 of the frame member 14 to pivot with respect to the rear portion 22 of the frame member 14. The front down tube member 25 is hingably coupled to the rear down tube member 27 to permit the front portion 20 of the frame member 14 to pivot with respect to the rear portion 22 of the frame member 14.

Figure 1:
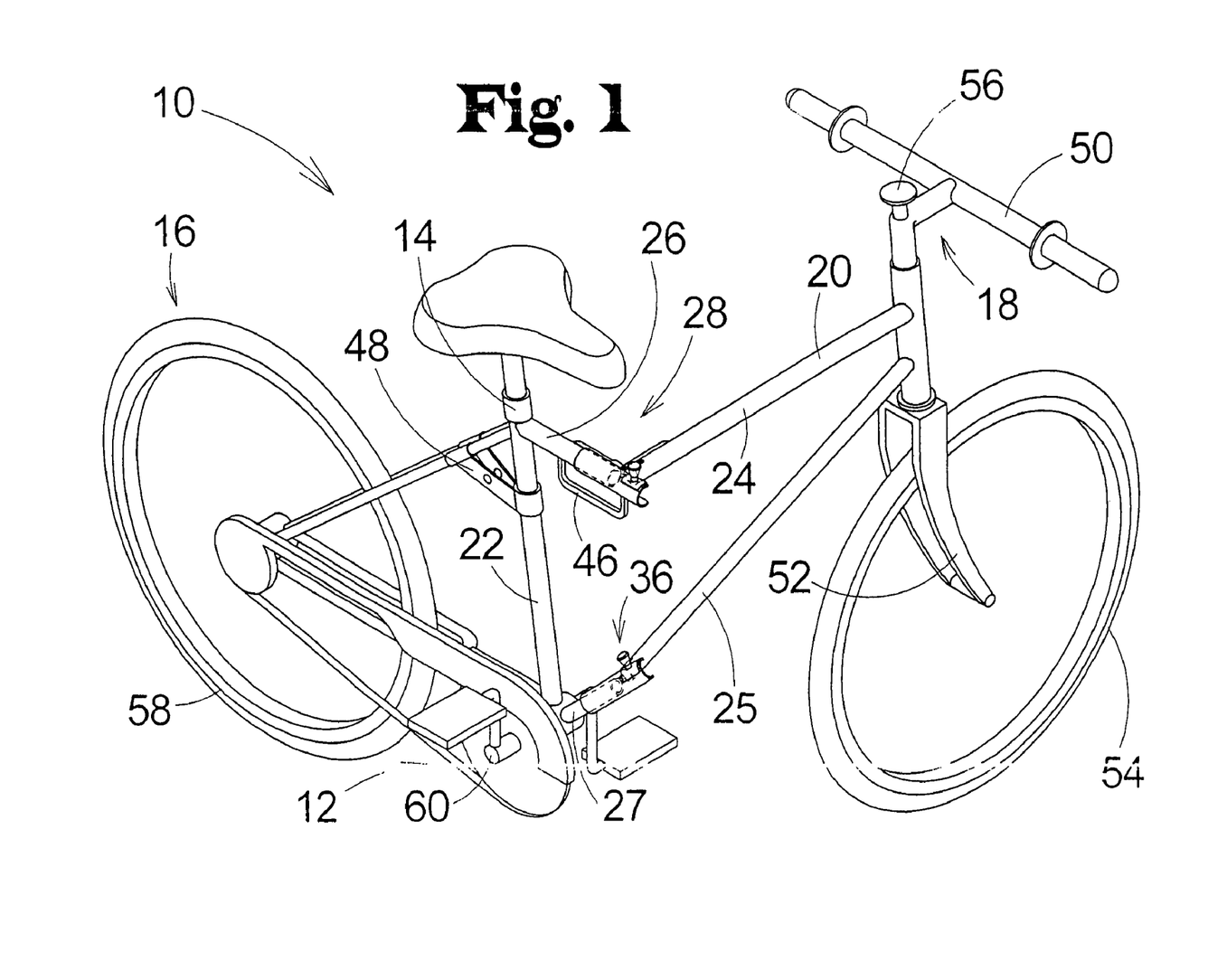
FIG. 1 is a perspective view illustrating a tool less folding bicycle, constructed in accordance with the present invention.
Figure 2:
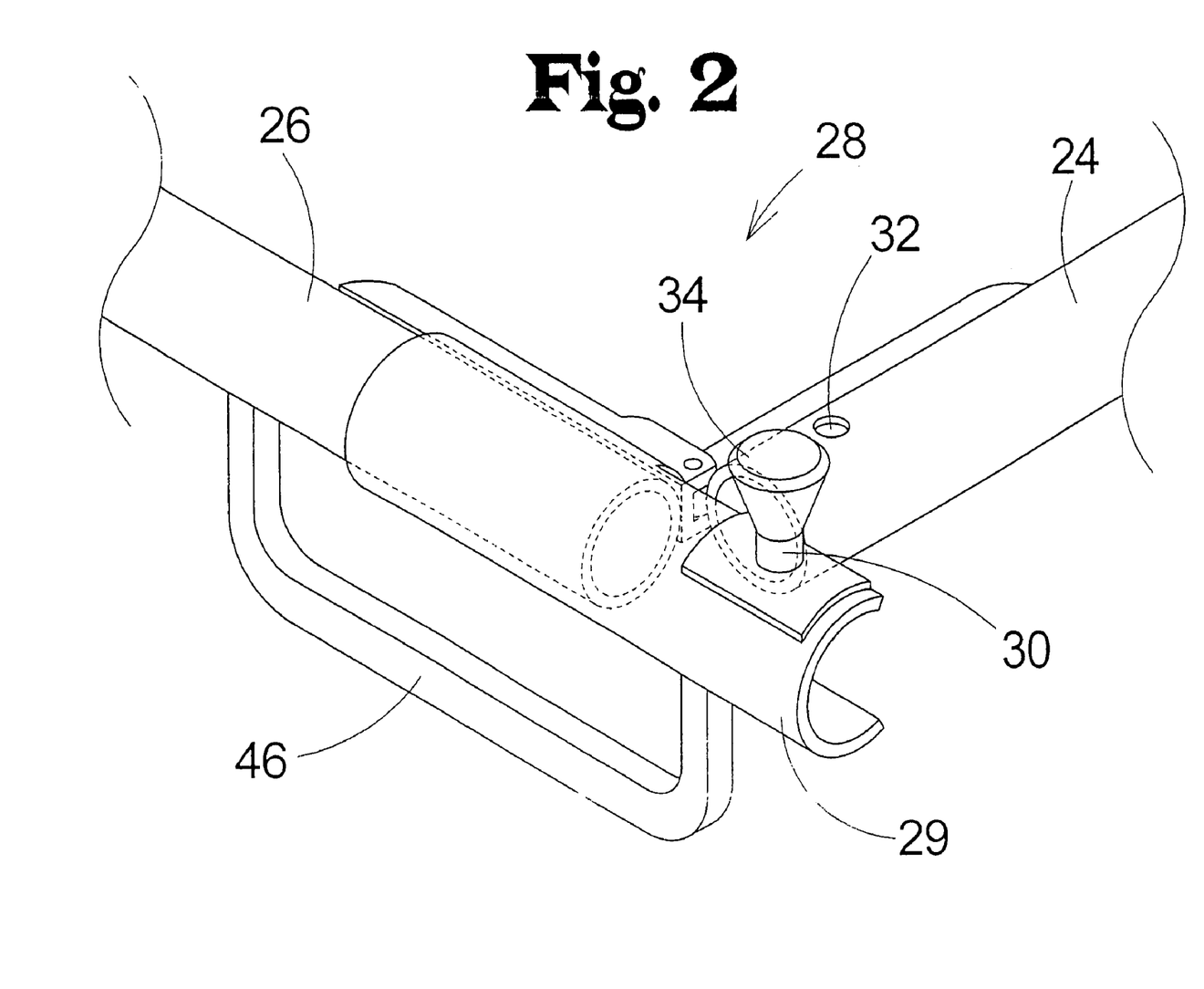
FIG. 2 is an enlarged perspective view illustrating an upper locking assembly of the folding bicycle, constructed in accordance with the present invention, with the front portion of the frame member being pivoted to the deployed position.

As illustrated in FIG. 2, the bicycle assembly 12 comprises an upper locking assembly 28. The upper locking assembly 28 is coupled to the rear crossbar member 26. The upper locking assembly 28 selectively engages the front crossbar member 24 to secure the front portion 20 of the frame member 14 in the deployed positioned when the front portion 20 is pivoted to the deployed position.

The upper locking assembly 28 comprises an upper cradle member 29. The upper cradle member 29 selectively receives the front crossbar member 24 when the front portion 20 of the frame member 14 is pivoted to the deployed position whereby the upper cradle member 29 is for inhibiting pivoting of the front crossbar member 24 beyond the rear crossbar member 26 when the front portion 20 of the frame member 14 is pivoted to the deployed position.

The upper locking assembly 28 comprises an upper locking pin 30. The upper locking pin 30 is slidably coupled to the upper cradle member 29. The upper locking pin 30 is selectively inserted into an upper locking aperture 32 extending into the front crossbar member 24. The upper locking pin 30 selectively inhibits inadvertent pivoting of the front portion 20 of the frame member 14 to the storage position when the upper locking pin 30 is inserted into the upper locking aperture 32 of the front crossbar member 24.

The upper locking assembly 28 further comprises an upper knob 34. The upper knob 34 is coupled to the upper locking pin 30 whereby the upper knob 34 is for facilitating sliding the upper locking pin 30 from the upper locking aperture 32 of the front crossbar member 24 by the user to permit the front portion 20 of the frame member 14 to be pivoted with respect to the rear portion 22 of the frame member 14.

Figure 3:
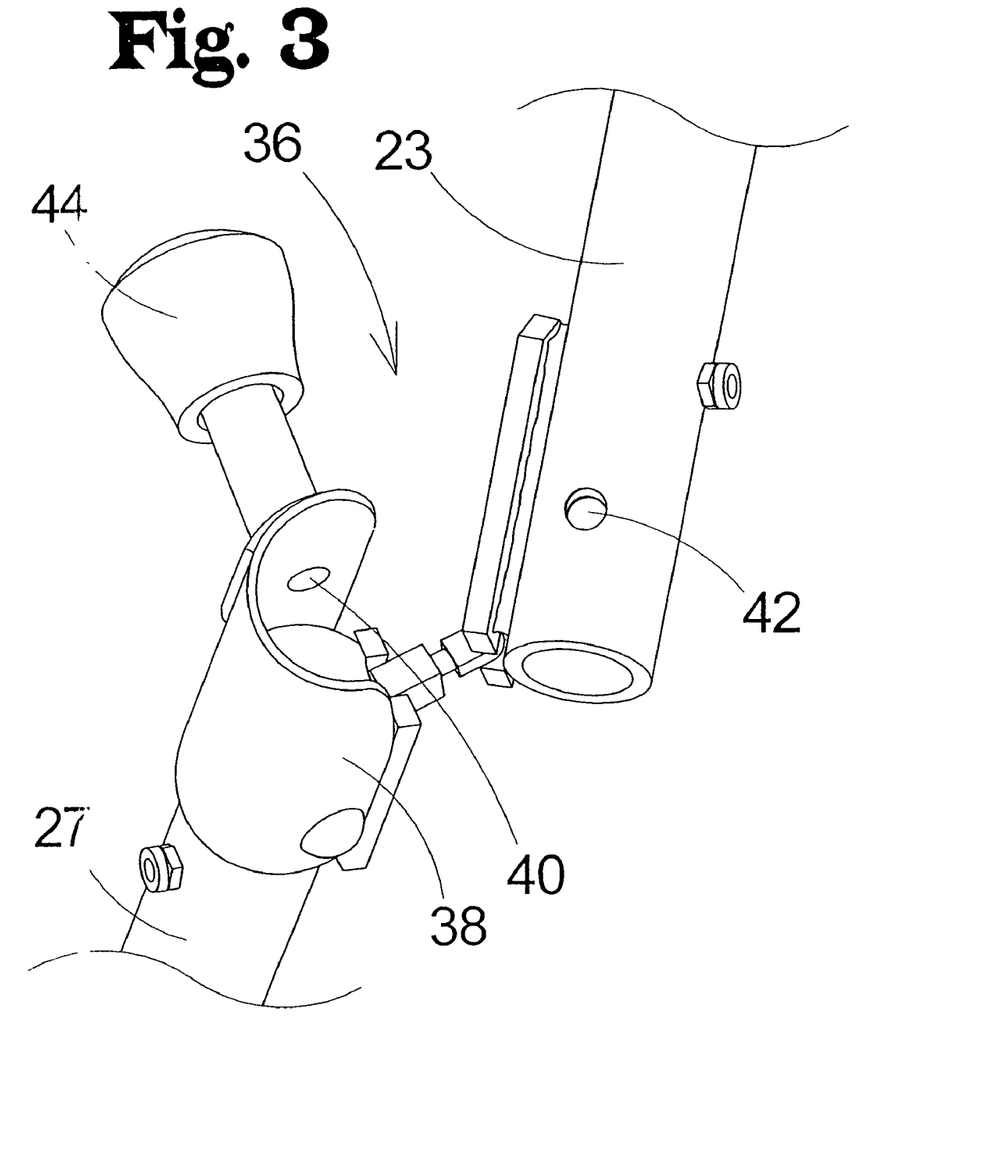
FIG. 3 is an enlarged perspective view illustrating a lower locking assembly of the folding bicycle, constructed in accordance with the present invention.

As illustrated in FIG. 3, the bicycle assembly 12 comprises a lower locking assembly 36. The lower locking assembly 36 is coupled to the rear down tube member 27. The lower locking assembly 36 selectively engages the front down tube member 25 to secure the front portion 20 of the frame member 14 in the deployed positioned when the front portion 20 is pivoted to the deployed position.

The lower locking assembly 36 comprises a lower cradle member 38. The lower cradle member 38 selectively receives the front down tube member 25 when the front portion 20 of the frame member 14 is pivoted to the deployed position whereby the lower cradle member 38 is for inhibiting pivoting of the front down tube member 25 beyond the rear down tube member 27 when the front portion 20 of the frame member 14 is pivoted to the deployed position.

The lower locking assembly 36 comprises a lower locking pin 40. The lower locking pin 40 is slidably coupled to the lower cradle member 38. The lower locking pin 40 is selectively inserted into a lower locking aperture 42 extending into the front down tube member 25. The lower locking pin 40 selectively inhibits inadvertent pivoting of the front portion 20 of the frame member 14 to the storage position when the lower locking pin 40 is inserted into the lower locking aperture 42 of the front down tube member 25.

The lower locking assembly 36 comprises a lower knob 44. The lower knob 44 is coupled to the lower locking pin 40 whereby the lower knob 44 is for facilitating sliding the lower locking pin 40 from the lower locking aperture 42 of the front down tube member 25 by the user to permit the front portion 20 of the frame member 14 to be pivoted with respect to the rear portion 22 of the frame member 14.

A handle member 46 is coupled to the rear crossbar member 26 of the frame member 14. The handle member 46 is designed for being gripped by the user to facilitate transporting of the bicycle assembly 12 when the front portion 20 of the frame member 14 is in the storage position.

Figure 5:
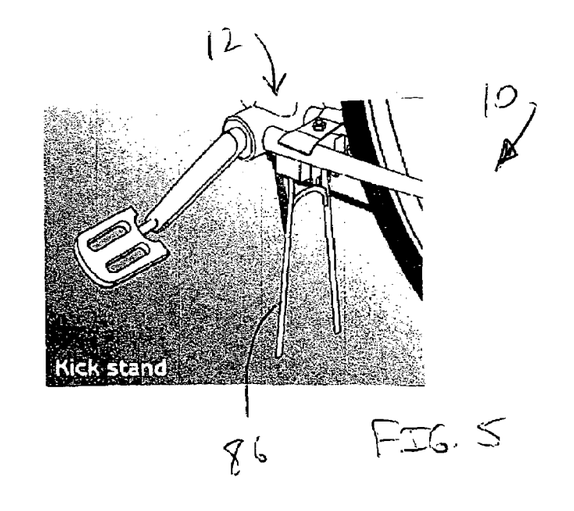
FIG. 5 is a perspective view illustrating a kickstand of the folding bicycle, constructed in accordance with the present invention.

As illustrated in FIG. 5, the bicycle assembly 12 of the bicycle 10 has a kick stand 86 mounted to the rear portion 22. The kickstand 86 is moveable from a riding position adjacent the rear portion 22 to a folding position, as illustrated. The kick stand 86 allows the front portion 20 of the bicycle assembly 12 to elevate at least slightly above the surface during the folding process thereby facilitating the folding process and allowing the user to easily fold the bicycle assembly 12.

Figure 4:
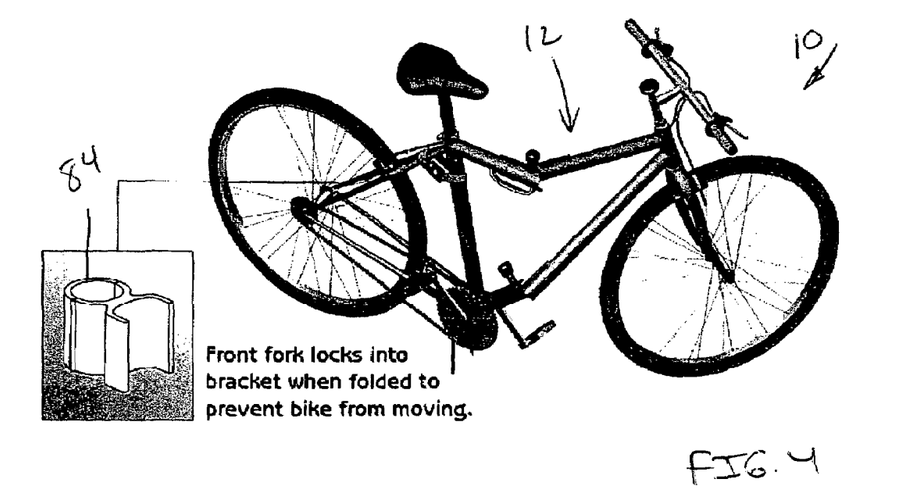
FIG. 4 is a perspective view illustrating the folding bicycle, constructed in accordance with the present invention, with a front fork receiving bracket.

As illustrated in FIG. 4, to facilitate maintaining the bicycle assembly 12 in the storage position, the rear fork of the bicycle assembly 12 further comprises a bracket 84 for receiving the front fork member 52 of the bicycle assembly 12 when the bicycle assembly 12 is in the storage position.

Figure 6:
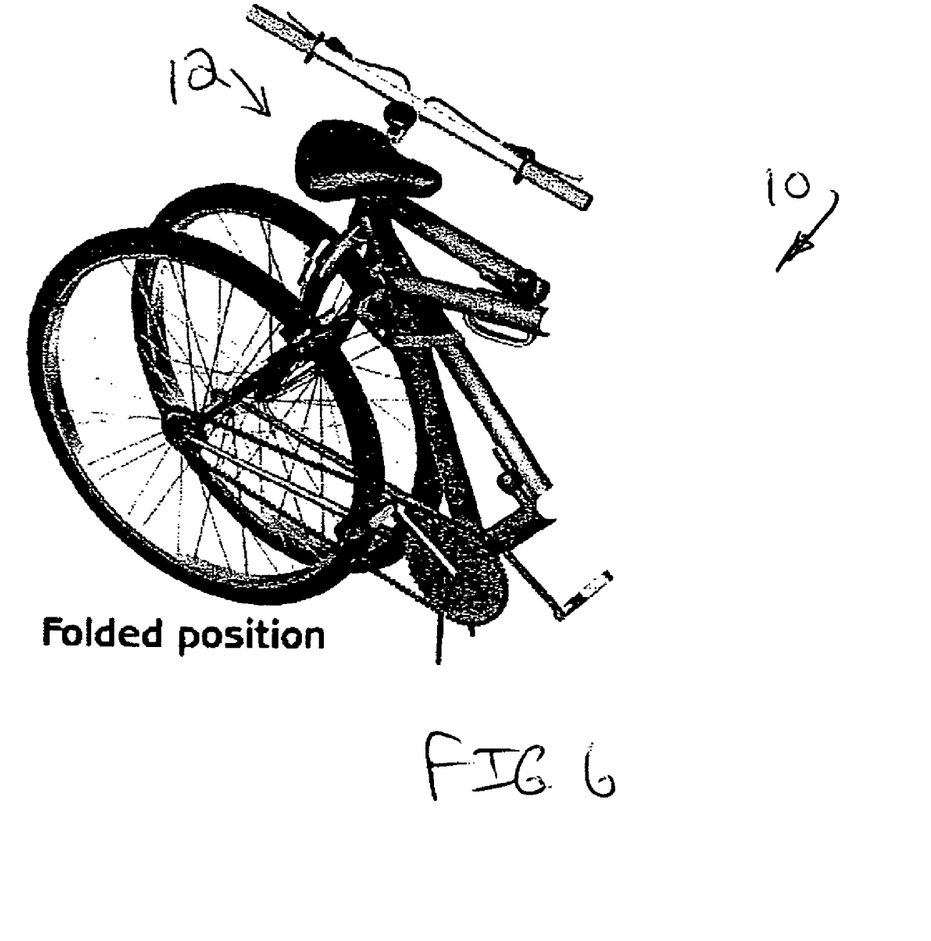
FIG. 6 is a perspective view illustrating the folding bicycle, constructed in accordance with the present invention, with the bicycle in the folded position.

As illustrated in FIG. 6, to further facilitate maintaining the bicycle assembly 12 in the storage position, a strap member 48 is coupled to the rear portion 22 of the frame member 14. The strap member 48 selectively wraps about the front down tube member 25 whereby the strap member 48 selectively maintains the front portion 20 of the frame member 14 in the storage position to inhibit inadvertent pivoting of the front portion 20 of the frame member 14 with respect to the rear portion 22 of the frame member 14.

The steering assembly 18 comprises a steering member 50, a fork member 52 and at least one front wheel 54. The fork member 52 is rotatably coupled to the frame member 14. The front wheel 54 is rotatably coupled to the fork member 52 whereby the front wheel 54 is designed for rolling across the support surface. The steering member 50 is operationally coupled to the fork member 52 opposite the front wheel 54 whereby the steering member 50 is for controlling rotation of the fork member 52 with respect to the frame member 14 to steer the bicycle assembly 12 when the bicycle assembly 12 is propelled across the support surface.

The steering assembly 18 comprises a hub assembly 56. The hub assembly 56 is operationally coupled between the fork member 52 and the steering member 50. The hub assembly 56 is for permitting the steering member 50 to be selectively pivoted between a parallel position and a perpendicular position when the user actuates the hub member. The parallel position is defined by the steering assembly 18 being positioned substantially parallel to the front wheel 54 for facilitating storage. The perpendicular position is defined by the steering member 50 being positioned substantially perpendicular to the front when for facilitating steering of the bicycle assembly 12 in the deployed position for riding the bicycle.

The drive assembly 16 comprises at least one rear wheel 58 and a pedal assembly 60. The rear wheel 58 is rotatably coupled to the frame member 14 whereby the rear wheel 58 is designed for rolling across the support surface. The pedal assembly 60 is operationally coupled to frame member 14 whereby the pedal assembly 60 is designed for being actuated by the user when the user is positioned on the seat on the frame member 14. The pedal assembly 60 is operationally coupled to the rear wheel 58 whereby the pedal assembly 60 rotates the rear wheel 58 with respect to the frame member 14 to propel the bicycle assembly 12 across the support surface.

To use, the user pivots the front portion 20 of the frame member 14 to the deployed position. The upper locking pin 30 and the lower locking pin 40 are secured to inhibit inadvertent pivoting of the front portion 20 of the frame member 14 when the user is using the bicycle assembly 12. The user actuates the hub assembly 56 of the steering assembly 18 and pivots the steering member 50 into the perpendicular position to allow the user to steer when the user is using the bicycle assembly 12. The hub assembly 56 of the steering assembly 18 is actuated to allow the user to pivot the steering member 50 to the parallel position to facilitate storage of the bicycle assembly 12 when not in use. The upper locking pin 30 and the lower locking pin 40 are released and the front portion 20 of the frame member 14 is pivoted to the storage position so that the clip member 48 engages the steering assembly 18 to prevent inadvertent pivoting of the front portion 20 of the frame member 14 with respect to the rear portion 22 of the frame member 14 when the bicycle assembly 12 is being stored.

In an alternative embodiment, the bicycle assembly 12 further comprises a kickstand for maintaining the bicycle in a nearly upright position while not being ridden. This affords the user the convenience of easy mounting and prevents damage to the bicycle. Any appropriate geometric configuration which is suitable for use with bicycle assembly 12 can be utilized. These configurations include L-shaped, U-shaped or H-shaped stands, for example. One such configuration can be essentially an H-shaped configuration. In an H-shaped configuration kickstand, the top ends of the H are pivotally mounted to the base of the bicycle frame in front of the pedal assembly. When the kickstand is to be used, the rider dismounts the bicycle and pushes on the lower end of one of the ends of the H opposite the end which is mounted to the frame with his or her foot thus causing the kickstand to pivot into the lowered position. The rider then moves the bicycle back slowly to stabilize the weight of the bicycle between the tires and the kickstand. When the rider wishes to disengage the kickstand, he or she moves the bicycle forward slightly to destabilize the bicycle from the two ends of the kickstand on the ground thereby freeing the kickstand which is then positioned to its storage position which is essentially horizontal, or parallel to the ground.

Directions on Folding the Bicycle:
1) Before folding, push kickstand down to support the frame;
2) Pull up and turn clockwise both control pins that are in the middle of the frame;
3) Push the frame in from the middle of the top bar to the left side of the bicycle and fold;
4) Buckle the frame together securing both halves of the frame together and inhibiting them from opening; and
5) Press the front wheel fork towards the rear wheel fork to lock both wheels in place.

How to Fold the Handle Bar:
1) Turn the king bolt located in the middle of the handle bar counter clockwise until the handle bar is loosened;
2) Pull up and turn the handle bar until it is parallel with the frame; and
3) Close the king bolt tightly keeping the handle bar parallel to the frame.

Adjusting the Seat:
1) Loosen the security bolt located under the seat;
2) Adjust the height of the seat; and
3) Tighten the security bolt.

How to Open the Bicycle from the Folded Position:
1) From the folded position, press the red button to unlock the frame, then hold front fork and pull away from the rear bar;
2) Hold the middle of the handle bar and open the frame;
3) Hold the middle of the frame and pull to the right side until the frame is straight; and
4) Turn the control pins until they fall into place making certain that both frame control pins are completely down to the white border.

How to Unfold the Handle Bar:
1) Open the king bolt and straighten out the handle bar until the king pin falls into place. It will line up correctly with the front wheel without any other adjustment; and
2) Tighten the king bolt firmly ensuring safety.

The folding bicycle 10 of the present invention is designed to be carried in any kind of transportation. No bicycle rack is needed because of the unique design. A user can fold the bicycle 10 and carry it in any vehicle, built with a handle to pull it up and down the stairs, and can be stored in any corner of the house or office. For anti-theft purposes, specifically stealing of the wheels, the bicycle assembly folds in half and then both forks snap together.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A folding bicycle assembly comprising:
   a frame member for supporting a user on a support surface when the user is seated on the frame member, the frame member comprises a front portion hingably coupled to a rear portion and pivotally movable between a deployed position and a storage position with respect to the rear portion of the frame member, the deployed position being defined by the front portion being substantially aligned with the rear portion of the frame member allowing the frame member to be propelled across the support surface, the storage position being defined by the front portion of the frame member being pivoted to a position adjacent the rear portion of the frame member to facilitate storage of the bicycle assembly;
   a drive assembly operationally coupled to the frame member, the drive assembly actuatable by the user for propelling the frame member across the support surface;
   a steering assembly operationally coupled to the frame member for steering the frame member across the support surface when the frame member is being propelled by the drive assembly;
   a clip member coupled to the frame member for selectively engaging the steering assembly, the clip member selectively maintaining the front portion of the frame member in the storage position inhibiting inadvertent pivoting of the front portion of the frame member with respect to the rear portion of the frame member; and
   a kickstand secured to the rear portion of the frame member and moveable from a riding position to a folding position, the kickstand elevating the front portion of the frame member when moved to the folding position.

2. The folding bicycle assembly of claim 1 wherein the front portion of the frame member has a front crossbar member and a front down tube member, the rear portion of the frame member has a rear crossbar member and a rear down tube member, the front crossbar member being hingably coupled to the rear crossbar member permitting the front portion of the frame member to pivot with respect to the rear portion of the frame member, the front down tube member being hingably coupled to the rear down tube member permitting the front portion of the frame member to pivot with respect to the rear portion of the frame member, the front down tube member receivable within the clip member.

3. The folding bicycle assembly of claim 2 wherein the bicycle assembly has an upper locking assembly, the upper locking assembly being coupled to the rear crossbar member, the upper locking assembly selectively engaging the front crossbar member to secure the front portion of the frame member in the deployed positioned when the front portion is pivoted to the deployed position.

4. The folding bicycle assembly of claim 3 wherein the upper locking assembly has an upper cradle member, the upper cradle member selectively receiving the front crossbar member when the front portion of the frame member is pivoted to the deployed position such that the upper cradle member is for inhibiting pivoting of the front crossbar member beyond the rear crossbar member when the front portion of the frame member is pivoted to the deployed position.

5. The folding bicycle assembly of claim 4 wherein the upper locking assembly has an upper locking pin, the upper locking pin being slidably coupled to the upper cradle member, the upper locking pin selectively insertable into an upper locking aperture extending into the front crossbar member, the upper locking pin selectively inhibiting inadvertent pivoting of the front portion of the frame member to the storage position when the upper locking pin is inserted into the upper locking aperture of the front crossbar member.

6. The folding bicycle assembly of claim 5 wherein the upper locking assembly has an upper knob, the upper knob coupled to the upper locking pin such that the upper knob facilitates sliding the upper locking pin from the upper locking aperture of the front crossbar member by the user permitting the front portion of the frame member to be pivoted with respect to the rear portion of the frame member.

7. The folding bicycle assembly of claim 2 wherein the bicycle assembly has a lower locking assembly, the lower locking assembly coupled to the rear down tube member, the lower locking assembly selectively engaging the front down tube member securing the front portion of the frame member in the deployed positioned when the front portion is pivoted to the deployed position.

8. The folding bicycle assembly of claim 7 wherein the lower locking assembly has a lower cradle member, the lower cradle member selectively receiving the front down tube member when the front portion of the frame member is pivoted to the deployed position such that the lower cradle member inhibits pivoting of the front down tube member beyond the rear down tube member when the front portion of the frame member is pivoted to the deployed position.

9. The folding bicycle assembly of claim 8 wherein the lower locking assembly has a lower locking pin, the lower locking pin slidably coupled to the lower cradle member, the lower locking pin being selectively insertable into a lower locking aperture extending into the front down tube member, the lower locking pin selectively inhibiting inadvertent pivoting of the front portion of the frame member to the storage position when the lower locking pin is inserted into the lower locking aperture of the front down tube member.

10. The folding bicycle assembly of claim 9 wherein the lower locking assembly has a lower knob, the lower knob coupled to the lower locking pin such that the lower knob is facilitates sliding the lower locking pin from the lower locking aperture of the front down tube member by the user to permit the front portion of the frame member to be pivoted with respect to the rear portion of the frame member.

11. The folding bicycle assembly of claim 1 wherein a handle member is coupled to the frame member, the handle member grippable by the user facilitating transporting of the bicycle assembly when the front portion of the frame member being in the storage position.

12. The folding bicycle assembly of claim 1 wherein the steering assembly has a steering member, a fork member, and at least one front wheel, the fork member being rotatably coupled to the frame member, the front wheel rotatably coupled to the fork member such that the front wheel is adapted for rolling across the support surface, the steering member operationally coupled to the fork member opposite the front wheel where by the steering member is for controlling rotation of the fork member with respect to the frame member to steer the frame member when the frame member is propelled across the support surface.

13. The folding bicycle assembly of claim 12 wherein the steering assembly has a hub assembly, the hub assembly operationally coupled between the fork member and the steering member, the hub assembly permitting the steering member to be selectively pivoted between a parallel position and a perpendicular position when the hub member is actuated by the user, the parallel position defined by the steering assembly being positioned substantially parallel to the front wheel for facilitating storage, the perpendicular position defined by the steering member being positioned substantially perpendicular to the front when for facilitating steering of the bicycle assembly.

14. The folding bicycle assembly of claim 1 wherein the drive assembly has at least one rear wheel and a pedal assembly, the rear wheel rotatably coupled to the frame member such that the rear wheel is adapted for rolling across the support surface, the pedal assembly operationally coupled to frame member such that the pedal assembly is actuatable by the user when the user is positioned on the frame member, the pedal assembly operationally coupled to the rear wheel such that the pedal assembly rotates the rear wheel with respect to the frame member to propel the frame member across the support surface.

15. A folding bicycle assembly for reducing the amount of space needed during storage, the folding bicycle assembly comprising:

a bicycle assembly being adapted for being ridden by a user across a support surface, the bicycle assembly comprising a frame member, a drive assembly and a steering assembly, the drive assembly being operationally coupled to the frame member such that the drive assembly is adapted for engaging the support surface, the drive assembly being adapted for being actuated by the user such that the drive assembly propels the frame member across the support surface when the drive assembly being actuated by the user, the frame member being adapted for supporting the user when the user is seated on the frame member, the steering assembly being operationally coupled to the frame member such that the steering assembly is for steering the frame member across the support surface when the frame member is being propelled by the drive assembly, wherein the frame member comprises a front portion and rear portion, the front portion of the frame member being hingably coupled to the rear portion, the front portion of the frame member being pivotal between a deployed position and a storage position with respect to the rear portion of the frame member, the deployed position being defined by the front portion being substantially aligned with the rear portion of the frame member to allow the frame member to be propelled across the support surface, the storage position being defined by the front portion of the frame member being pivoted to a position adjacent the rear portion of the frame member to facilitate storage of the bicycle assembly, the steering assembly being operationally coupled to the front portion of the frame member, the drive assembly being operationally coupled to the rear portion of the frame member, further wherein the front portion of the frame member comprises a front crossbar member and a front down tube member, the rear portion of the frame member comprising a rear crossbar member and a rear down tube member, the front crossbar member being hingably coupled to the rear crossbar member to permit the front portion of the frame member to pivot with respect to the rear portion of the frame member, the front down tube member being hingably coupled to the rear down tube member to permit the front portion of the frame member to pivot with respect to the rear portion of the frame member, further wherein the bicycle assembly comprising an upper locking assembly, the upper locking assembly being coupled to the rear crossbar member, the upper locking assembly selectively engaging the front crossbar member to secure the front portion of the frame member in the deployed positioned when the front portion is pivoted to the deployed position, further wherein the upper locking assembly comprises an upper cradle member, the upper cradle member selectively receiving the front crossbar member when the front portion of the frame member is pivoted to the deployed position such that the upper cradle member is for inhibiting pivoting of the front crossbar member beyond the rear crossbar member when the front portion of the frame member is pivoted to the deployed position, further wherein the upper locking assembly comprises an upper locking pin, the upper locking pin being slidably coupled to the upper cradle member, the upper locking pin being selectively inserted into an upper locking aperture extending into the front crossbar member, the upper locking pin selectively inhibiting inadvertent pivoting of the front portion of the frame member to the storage position when the upper locking pin is inserted into the upper locking aperture of the front crossbar member, further wherein the upper locking assembly comprises an upper knob, the upper knob being coupled to the upper locking pin such that the upper knob is for facilitating sliding the upper locking pin from the upper locking aperture of the front crossbar member by the user to permit the front portion of the frame member to be pivoted with respect to the rear portion of the frame member, further wherein the bicycle assembly comprises a lower locking assembly, the lower locking assembly being coupled to the rear down tube member, the lower locking assembly selectively engaging the front down tube member to secure the front portion of the frame member in the deployed positioned when the front portion is pivoted to the deployed position, further wherein the lower locking assembly comprises a lower cradle member, the lower cradle member selectively receiving the front down tube member when the front portion of the frame member being pivoted to the deployed position such that the lower cradle member is for inhibiting pivoting of the front down tube member beyond the rear down tube member when the front portion of the frame member is pivoted to the deployed position, further wherein the lower locking assembly comprises a lower locking pin, the lower locking pin being slidably coupled to the lower cradle member, the lower locking pin being selectively inserted into a lower locking aperture extending into the front down tube member, the lower locking pin selectively inhibiting inadvertent pivoting of the front portion of the frame member to the storage position when the lower locking pin is inserted into the lower locking aperture of the front down tube member, further wherein the lower locking assembly comprises a lower knob, the lower knob being coupled to the lower locking pin such that the lower knob is for facilitating sliding the lower locking pin from the lower locking aperture of the front down tube member by the user to permit the front portion of the frame member to be pivoted with respect to the rear portion of the frame member, a handle member being coupled to the frame member, the handle member being adapted for being gripped by the user to facilitate transporting of the bicycle assembly when the front portion of the frame member being in the storage position, a clip member being coupled to the frame member, the clip member selectively engages the steering assembly such that the clip member is for selectively maintaining the front portion of the frame member in the storage position to inhibit inadvertent pivoting of the front portion of the frame member with respect to the rear portion of the frame member, wherein the steering assembly comprises a steering member, a fork member and at least one front wheel, the fork member being rotatably coupled to the frame member, the front wheel being rotatably coupled to the fork member such that the front wheel is adapted for rolling across the support surface, the steering member being operationally coupled to the fork member opposite the front wheel where by the steering member is for controlling rotation of the fork member with respect to the frame member to steer the frame member when the frame member is propelled across the support surface, further wherein the steering assembly comprises a hub assembly, the hub assembly being operationally coupled between the fork member and the steering member, the hub assembly being for permitting the steering member to be selectively pivoted between a parallel position and a perpendicular position when the hub member is actuated by the user, the parallel position being defined by the steering assembly being positioned substantially parallel to the front wheel for facilitating storage, the perpendicular position being defined by the steering member being positioned substantially perpendicular to the front when for facilitating steering of the bicycle assembly, and further wherein the drive assembly comprises at least one rear wheel and a pedal assembly, the rear wheel being rotatably coupled to the frame member such that the rear wheel is adapted for rolling across the support surface, the pedal assembly being operationally coupled to frame member such that the pedal assembly is adapted for being actuated by the user when the user is positioned on the frame member, the pedal assembly being operationally coupled to the rear wheel such that the pedal assembly rotates the rear wheel with respect to the frame member to propel the frame member across the support surface.

16. The folding bicycle assembly of claim 15 further comprising a kickstand pivotally attached to the frame member.

17. A folding bicycle comprising:
a frame member comprises a front portion and rear portion, the front portion of the frame member being hingably coupled to the rear portion, the front portion of the frame member being pivotal between a deployed position and a storage position with respect to the rear portion of the frame member, the deployed position being defined by the front portion being substantially aligned with the rear portion of the frame member to allow the frame member to be propelled across a support surface, the storage position being defined by the front portion of the frame member being pivoted to a position adjacent the rear portion of the frame member to facilitate storage of the bicycle assembly, the steering assembly being operationally coupled to the front portion of the frame member, the drive assembly being operationally coupled to the rear portion of the frame member;

a clip member coupled to the frame member for selectively engaging the front portion, the clip member selectively maintaining the front portion of the frame member in the storage position inhibiting inadvertent pivoting of the front portion of the frame member with respect to the rear portion of the frame member; and a kickstand secured to the rear portion of the frame member and moveable from a riding position to a folding position, the kickstand elevating the front portion of the frame member when moved to the folding position.

18. The folding bicycle of claim 17 wherein the clip member comprises a two part tube member having a first part and a second part wherein the first part encircles and encloses the circumference of the tube which comprises the rear frame member, wherein the second part of the tube member comprises a C-shaped member attached to the first part of the tube member along its longitudinal side, wherein the open part of the C receives the bracket of the front frame member when the bicycle is in the storage position.

19. The folding bicycle of claim 17 wherein the kickstand is pivotally attached to the frame member wherein the kickstand comprises two elongate arms each having a first end and a second end, the first end for contacting the ground, and the second end for pivotal attachment to the frame member of the bicycle, the kickstand further comprising a cross member between the two elongate arms, wherein the cross member is perpendicular to the plane described by the two wheels of the bicycle and further wherein the cross member is essentially parallel to the ground.

* * * * *